Patented Jan. 11, 1938

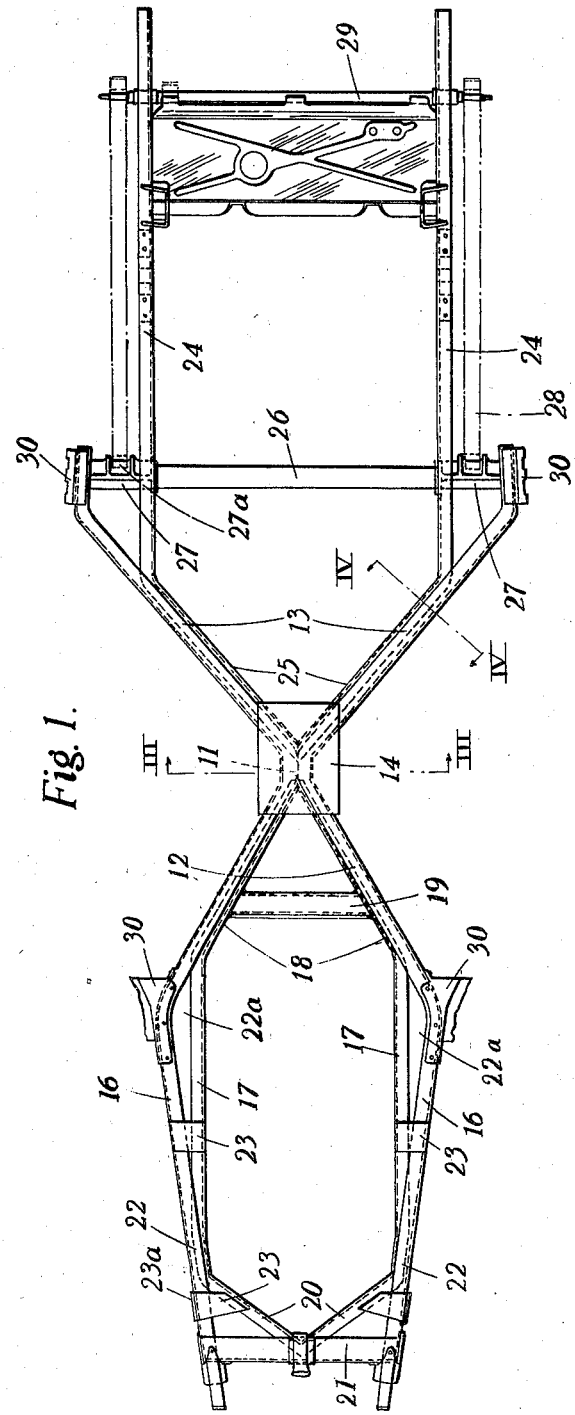
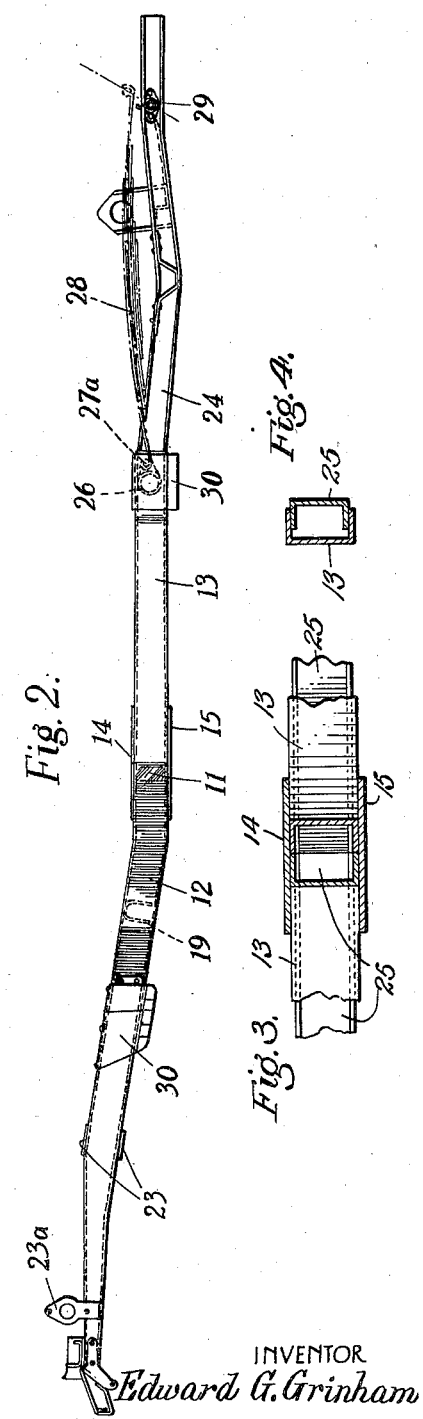

2,105,144

UNITED STATES PATENT OFFICE 2,105,144

CHASSIS-FRAME FOR MOTOR-VEHICLES

Edward George Grinham, Coventry, England, assignor of one-half to The Standard Motor Company Limited, Coventry, England Application October 20, 1936, Serial No. 106,670
In Great Britain May 21, 1936

11 Claims. (Cl. 280—106)

This invention relates to a chassis-frame, for a motor-vehicle, of the kind having two inwardly-facing channel-sectioned members which are sharply inwardly offset to contact with and be secured to one another, as by welding, to form an X between the ends of the frame with a relatively short length of box section at the junction of the X limbs.

A frame of this kind is described in U. S. Patent No. 2,050,945, in the name of the present applicant, and such frame has portions extending longitudinally to the front of the frame and formed integrally with the channel-sectioned members.

(Such portions are hereinafter referred to as "integral" longitudinally-extending portions and should not be confused with certain longitudinally-extending members which are hereinafter referred to, for purposes of distinction, as "independent" members.)

My main object is to provide an improved chassis-frame of the above kind which will be simple to produce and of very light weight for a given torsional rigidity.

According to the invention "independent" longitudinally-extending members are used at the rear of the frame, these having inwardly-inclined limbs at their front ends which extend into or serve for boxing in the adjacent X limbs to which they are secured, as by welding. Preferably such "independent" longitudinally-extending members are used both at the front and at the rear of the frame, and, if desired, they may run continuously throughout substantially the whole length of the frame, i. e., the front and rear "independent" members on one side of the frame may be integrally united with one another.

In the accompanying drawing:—

Figure 1 is a plan of one form of chassis-frame constructed according to the invention;

Figure 2 is an elevation thereof.

Figure 3 is an enlarged vertical section taken on the line III—III of Figure 1, and, Figure 4 is an enlarged vertical section taken on the line IV—IV of Figure 1.

In the construction illustrated, there are two of the aforesaid channel-sectioned members, with their flanges facing inwardly, which are sharply inwardly offset and are secured to one another at 11 to provide an X with a relatively short length of box section at the junction of the front X limbs 12, 12 with the rear X limbs 13, 13. These channel-sectioned members are preferably welded to one another and the joint reinforced by top and bottom plates 14, 15 which are also secured by welding. The front or outer ends of the front X limbs 12 are in this case integral with "integral" portions 16, 16 which extend longitudinally to the front end of the frame and between which the power unit (not shown) can be accommodated, without interference with the steering movements of the front road wheels.

The front end of the frame is reinforced by a sub-frame comprising "independent" longitudinally-extending members 17, 17 having at their rear ends inwardly-inclined limbs 18, 18 which extend into and serve for boxing in the front X limbs 12, being secured thereto as by welding. These "independent" members 17 are shown as being of channel section with their flanges extending outwardly. Near their rear ends they are cross-braced by the inverted channel-sectioned member 19, welded thereto, and their front ends are inwardly inclined, as shown at 20, and united to the crosspiece 21, of the "integral" longitudinally-extending portions 16, into which they extend and are secured by welding. At 22 they extend into the "integral" portions 16 where they may also be secured by welding, and 22a are elongated substantially triangular spaces left between each of the "integral" portions 16 and the adjacent "independent" member 17. In addition use may be made of brackets 23 for strengthening purposes, those parts marked 23a being adapted as shock-absorber brackets.

It will be noted that the rear or outer ends of the rear X limbs 13 are spaced from one another a greater distance than the front ends of the front X limbs 12 are, and they are also spaced from the rear "independent" longitudinally-extending members 24 which are substantially in line with the front ends of the front X-limbs. These rear "independent" members 24 are of channel section with their flanges facing outwardly, and they are formed at their front ends with inclined portions 25, 25 which extend into the interior of and serve for boxing in the rear X-limbs 13, preferably being welded thereto.

In addition the rear ends of the rear X limbs 13 are secured to the rear "independent" members 24 by a through transverse member. This may include a pressing or tube 26 secured at its ends to pressings or castings 27, 27 which are in turn secured, respectively, to the rear ends of the rear X limbs 13 and to the rear "independent" members 24. The castings carry pins 27a to which the front eyes of the longitudinally-extending rear springs 28 are secured. The rear ends of the latter are shackled to the ends of a rear cross member 29 secured to near the rear ends of the rear "independent" members 24. In this way fore-and-aft rear springs 28 can be widely spaced from one another in a manner which will tend to prevent rolling, and the stresses are very satisfactorily dealt with.

It will be evident that, if desired, the front "independent" members 17 may be respectively integrally formed with the rear "independent" members 24 instead of merely being integrally united thereto at the junction 11.

The chassis-frame as thus described is complete. The drawing also shows brackets 30, 30 at the outer ends of the X limbs adapted to have secured to them body sills (not shown), the body sills serving for further strengthening the chassis-frame.

What I claim as my invention and desire to secure by Letters Patent of the United States is:—

1. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, and independent longitudinally-extending members arranged at the rear of the frame, said independent members having inwardly-inclined limbs which are parallel to and extend into the rear X limbs and are secured thereto.

2. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, and independent longitudinally-extending channel-section members arranged at the rear of the frame with their channels facing outwardly, said independent members having inwardly-inclined limbs at their front ends which are parallel to and serve for boxing in the rear X limbs to which they are secured.

3. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X-limbs, independent longitudinally-extending members arranged at the rear of the frame, said independent members having inwardly-inclined limbs which extend into and are secured to the rear X limbs, the rear ends of the X limbs being spaced outside the adjacent independent members, and a through transverse member joining the rear ends of said X-limbs to said independent members.

4. A chassis-frame, according to claim 3, characterized in that said transverse member comprises a tube and castings secured to the tube at its ends, said casting being secured in turn, respectively, to the rear ends of the X limbs and to the adjacent independent members.

5. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, independent longitudinally-extending members arranged at the rear of the frame, said independent members having inwardly-inclined limbs which are parallel to and extend into the rear X limbs and are secured thereto, and independent longitudinally-extending members arranged at the front of the frame, the latter members having inwardly-inclined limbs which are parallel to and extend into and are secured to the front X limbs.

6. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, independent longitudinally-extending channel-section members arranged at the rear of the frame with their channels facing outwardly, said independent members having inwardly-inclined limbs at their front ends which are parallel to and serve for boxing in the rear X limbs to which they are secured, and independent longitudinally-extending channel-section members arranged at the front of the frame with their channels facing outwardly, the latter members having inwardly-inclined limbs at their rear ends which serve for boxing in the front X limbs to which they are secured.

7. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, independent longitudinally-extending members arranged at the rear of the frame, said independent members having inwardly-inclined limbs which are parallel to and extend into and serve for boxing in the rear X-limbs to which they are secured, and independent longitudinally-extending members arranged at the front of the frame, said front independent members having inwardly-inclined limbs which are parallel to and extend into and serve for boxing in the front X limbs to which they are secured, said front independent members and said rear independent members running continuously throughout substantially the whole length of the frame.

8. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, independent longitudinally-extending members arranged at the rear of the frame, said independent members having inwardly-inclined limbs which extend into the rear X limbs and are secured thereto, independent longitudinally-extending members arranged at the front of the frame, the latter members having inwardly-inclined limbs which extend into the front X limbs to which they are secured, and said channel-section members having integral portions extending longitudinally to the front of the frame outside said independent members at the front.

9. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, independent longitudinally-extending members arranged at the rear of the frame, said independent members having inwardly-inclined limbs which extend into the rear X limbs and are secured thereto, independent longitudinally-extending members arranged at the front of the frame, the latter members having inwardly-inclined limbs which extend into the front X limbs to which they are secured, and said channel-section members having integral portions extending longitudinally to the front of the frame outside said independent members at the front, each of said integral portions and the adjacent independent member being shaped so as to leave between them an elongated substantially triangular space.

10. For a motor-vehicle, a chassis-frame comprising inwardly-facing channel-section members, said members having parts which are sharply inwardly offset and contact with one another, said offset parts being secured to one another where they contact to form an X between the ends of the frame with a relatively short length of box-section at the junction of the X limbs, independent longitudinally-extending members arranged at the rear of the frame, said independent members having inwardly-inclined limbs which extend into and are secured to the rear X limbs, and brackets carried by the ends of all four X limbs, said brackets adapted to receive body sills for bridging said offset parts.

11. For a motor-vehicle, a chassis-frame comprising inwardly facing channel-section members, said members having parts which are sharply inwardly offset and contact with one another, said offset parts being secured to one another where they contact to form an X between the ends of the frame with a relatively short length of box-section at the junction of the X-limbs, and independently longitudinally-extending channel-section members arranged at the rear of the frame with their channels facing outwardly, said independent members joining the rear X limbs and having inwardly-inclined forward portions extending along said X limbs for a substantial distance and which serve for boxing in the rear X limbs along which they extend.

EDWARD G. GRINHAM.